F. R. WILLSON.
CONVEYER BELT SUPPORT.
APPLICATION FILED APR. 17, 1913.
1,088,195.
Patented Feb. 24, 1914.
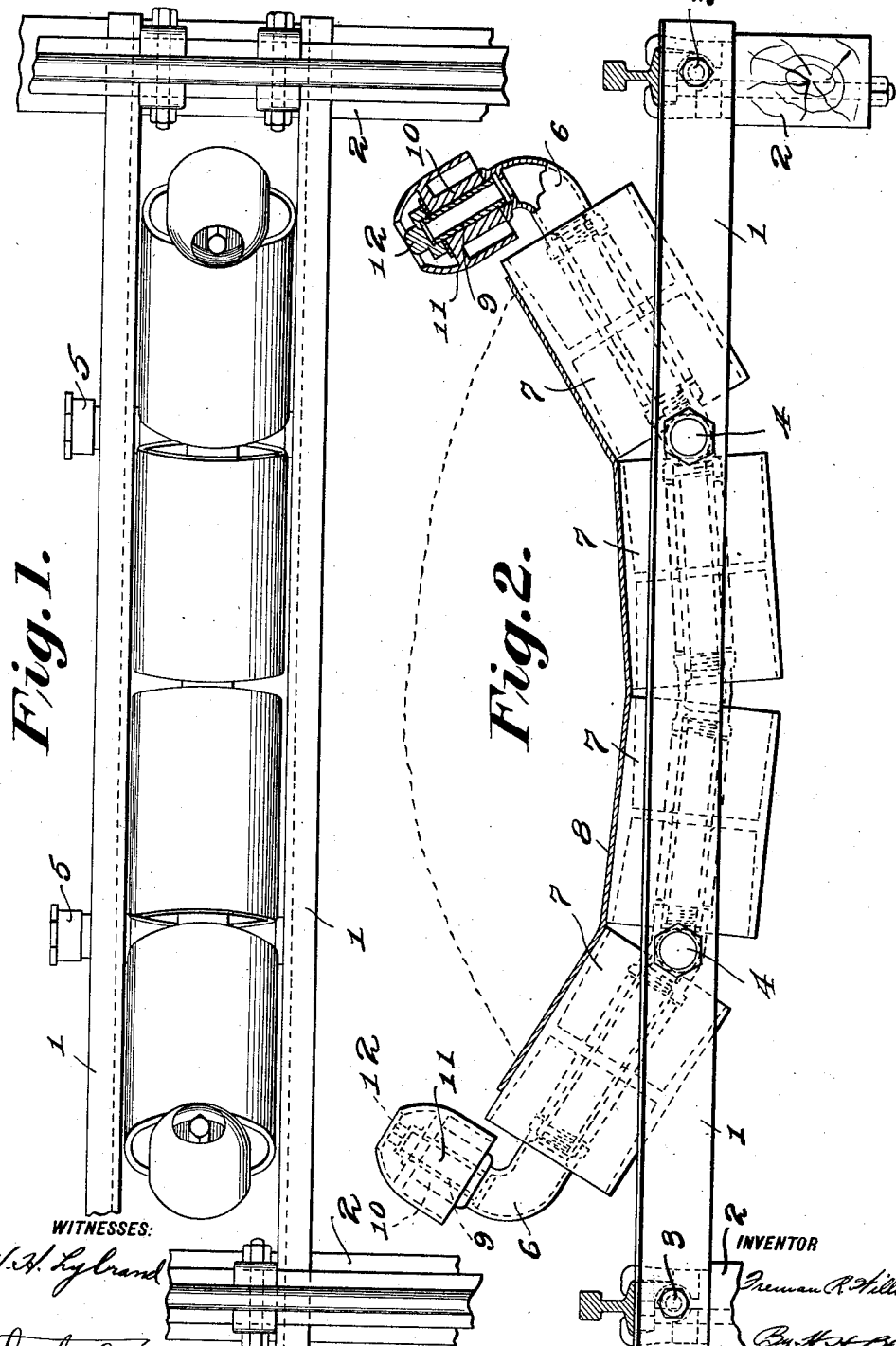

UNITED STATES PATENT OFFICE.

FREEMAN R. WILLSON, OF COLUMBUS, OHIO, ASSIGNOR TO THE JEFFREY MANUFACTURING COMPANY, OF COLUMBUS, OHIO, A CORPORATION OF OHIO.

CONVEYER-BELT SUPPORT.

1,088,195. Specification of Letters Patent. Patented Feb. 24, 1914.

Original application filed February 3, 1908, Serial No. 414,096. Divided and this application filed April 17, 1913. Serial No. 761,784.

*To all whom it may concern:*

Be it known that I, FREEMAN R. WILLSON, a citizen of the United States, residing at Columbus, in the county of Franklin and State of Ohio, have invented certain new and useful Improvements in Conveyer-Belt Supports, of which the following is a specification, reference being had therein to the accompanying drawings.

This invention relates to improvements in conveyer belt supports and in particular to guide idlers such as are mounted adjacent the edges of a belt runway for the purpose of holding the belt to its predetermined path.

The object of my invention is to provide a guide idler of such a form that when the belt is following its normal path, its edges will be presented to a surface of the idler at right angles thereto, and, at the same time, will serve the purpose of centering a belt without injury before or after it has passed through a tripping mechanism.

This application is a division of my co-pending application for conveyer belt supports, Serial No. 414,096, filed February 3, 1908.

In the drawings:—Figure 1 is a plan view of a series of conveyer belt supporting rollers showing my improved form of guide idler positioned at each side thereof. Fig. 2 is a side elevation of the apparatus shown in Fig. 1, one of the guide idlers being shown in section.

Referring to the drawings, the numerals 1, 1 indicate channel beams secured at their ends by means of bolts 3, 3 to the beams 2. Suspended between the two channels 1, 1 is a tubular framework carried on trunnions 4 which are bolted to the beams. Troughing pulleys 7 are mounted on the tubular frame and support the conveyer belt 8 with its load. The trunnions are hollow and carry at one side grease cups 5, 5, whereby lubricant is fed to the interior of the tubular frame for the purpose of lubricating the pulley bearings. Tubular L's 6 extend from each end of the tubular framework. Short pipe sections 9, 9 are screw-threaded into upturned ends of the L's 6 and serve as bearings for the hubs 10 with the guide idlers 11. The lower ends of the hubs 10 abut against the upper faces of the L's 6 and the idlers are held in position upon their bearings by means of the cap nuts 12 threaded over the ends of the pipe 9. Approximately two-thirds of the axial lengths of the guide idler pulleys are formed parallel with their axes, the upper ends being then tapered inward toward the axis in a smooth curve to the edges of the upper end opening through which the caps 12 are inserted. The guide idlers are so mounted with relation to the troughing pulleys that their straight sides are approximately at right angles to the edges of the belt when it is in its normal position running along the troughing pulleys. When in this position the belt, if shifted sidewise, contacts with the parallel sides of the idler and is held in its course. When a tripping mechanism is employed for the purpose of discharging a load from a conveyer of this form, a belt must necessarily leave its troughing idlers and move upward through the tripper and then down once more to its troughing idlers. It is for conditions such as this that the upper ends of the guide idlers are tapered inward toward their axes.

Tapered pulleys are well known in various other arts, as for example, in guiding sheets of fabric or paper along a predetermined path. In such instances the axes of the pulleys are usually in a plane approximately parallel to the plane of the material, the edges of which are constantly in contact with the tapered portions. The movement of the fabric or paper to one side or another is counteracted by the action of the pulleys, and the material is thus kept in its predetermined path. Tapered pulleys have also been used in other mechanisms, but never, so far as I am aware, have they been positioned as and for the purpose previously set forth.

When a traveling belt tripper is used and the belt is being lifted from the troughing pulleys and again lowered thereto, it is very desirable to have some means for coaxing the belt into the proper position with respect to the troughing pulleys. By tapering the upper edge of the pulley and forming the lower end practically at right angles to the adjacent surface of the troughing pulley, the belt is properly and smoothly guided into position as it is lowered vertically, and when in its normal position, if it deviates from its predetermined course, it will abut against a surface at right angles to its edges rather than one which is tapered.

What I claim is:

1. In a conveyer, a belt support comprising a frame, a set of troughing pulleys thereon, and a pair of edge guiding mechanisms each provided with a rotary abutment perpendicular to the face of the adjacent troughing pulley and further providing a rotary abutment at higher points which inclines outwardly from the said perpendicular direction.

2. In a conveyer, a belt support comprising a framework, a set of troughing pulleys mounted thereon, and a pair of guide pulleys each arranged axially perpendicularly to the face of the adjacent troughing pulley and tapered inward toward its upper end.

3. In a conveyer belt support comprising a framework, a set of troughing pulleys mounted thereon, and an edge guiding pulley arranged with its axis approximately at right angles to the face of the adjacent troughing pulley, the upper portion of the face of the said pulley having a partial elliptical form.

4. In a conveyer belt support the combination of a framework, a set of troughing pulleys mounted thereon, and a guide pulley with its axis approximately at right angles to the face of the adjacent troughing pulley, said guide pulley being gradually reduced in diameter at its upper portion.

In testimony whereof I affix my signature in the presence of two witnesses.

FREEMAN R. WILLSON.

Witnesses:
G. W. KALTENBACH,
DUDLEY T. FISHER.